US005899558A

United States Patent [19]

Suzuki et al.

[11] Patent Number: 5,899,558

[45] Date of Patent: May 4, 1999

[54] ILLUMINATING KNOB FOR SWITCH AND MANUFACTURING METHOD THEREOF

[75] Inventors: Toshiki Suzuki; Norio Sekine; Takanori Terao, all of Saitama, Japan

[73] Assignee: Toyodenso Kabushiki Kaisha, Tokyo, Japan

[21] Appl. No.: 08/792,132

[22] Filed: Jan. 31, 1997

[30] Foreign Application Priority Data

Jan. 31, 1996 [JP] Japan .................................... 8-016147

[51] Int. Cl.[6] ........................................... B60Q 3/04

[52] U.S. Cl. ................................ 362/489; 362/26; 362/31

[58] Field of Search ................................ 362/23, 26, 80, 362/83.3, 85, 31, 30, 491, 489

[56] References Cited

U.S. PATENT DOCUMENTS

| | | | |
|---|---|---|---|
| 4,874,913 | 10/1989 | Aoki et al. | 362/85 |
| 5,095,409 | 3/1992 | Dematteo et al. | 362/23 |
| 5,171,080 | 12/1992 | Bathurst | 362/23 |
| 5,432,684 | 7/1995 | Fye et al. | 362/85 |
| 5,434,757 | 7/1995 | Kashiwagi | 362/23 |
| 5,521,342 | 5/1996 | Bartley et al. | 362/31 |
| 5,537,300 | 7/1996 | Kraines et al. | 362/85 |
| 5,568,367 | 10/1996 | Park | 362/85 |
| 5,641,221 | 6/1997 | Schindele et al. | 362/80 |
| 5,642,929 | 7/1997 | Ushimaru | 362/85 |
| 5,702,078 | 12/1997 | Shaw | 362/85 |

*Primary Examiner*—Laura Tso
*Attorney, Agent, or Firm*—Birch, Stewart, Kolasch & Birch, LLP

[57] ABSTRACT

A main body of an illuminating knob is formed as a base made of a transparent resin. An undercoat layer and a topcoat layer are applied on a peripheral surface of the base. A pattern inside eliminating portion is formed in a shape of an indicating pattern as a marked portion by a laser etching or a partial exfoliation of the topcoat layer on the bottom portion. By passing light from a light source provided inside of the knob through the marked portion, an indication via passing through light is achieved.

11 Claims, 8 Drawing Sheets

ILLUMINATING KNOB FOR SWITCH AND MANUFACTURING METHOD THEREOF

BACKGROUND OF THE INVENTION

1. Field of the Invention

The present invention relates to an illuminating knob used to operate various kinds of switch devices such as electric equipment for a vehicle.

2. Description of the Background Art

An example of an illuminating knob is explained based on the following illustrated example. FIG. 7 is a schematically explanatory view of a partial section of the illuminating knob, wherein the knob is substantially shaped in a bottomed cylinder. A window hole 3 is provided on a bottom portion 2 of a base 1 which functions as a main body made of a resin in which no light penetrates (hereinafter, refereed to as "non-penetration") due to the mixing of colored cosmetics or other material in the resin. An accommodating concave 4 with a hollowed inner side is formed on the bottom portion 2 including the window holes 3.

A lens 5, a transparent colored plate 6 and a louver body 7 are fitted in the accommodating concave 4 and light from a bulb 8 inside of the base 1 passes through the louver body 7. A slit 9 appears inevitably on a peripheral of the louver body 7 owing to a tolerance in the fitting portion.

FIG. 8 is a view showing an example of the louver body 7, wherein a transparent plate 11 is superposed on a louver 10 made of a non-penetration rubber. A marked layer 12, printed with non-penetration black paint, is formed on the transparent plate 11 and an inside of an indicating pattern is eliminated from the marked layer 12. A non-diffusion paint layer 13 is formed on a rear surface of the transparent plate 11.

Another transparent plate 14 is superposed on an opposite surface of the louver 10. The light from the bulb 8 passes through the louver 10 in a state of little dispersion and an indication is accomplished via the light passing through an eliminated portion of the marked layer 12.

At this time, because the dispersion of the penetrating light is lessened owing to the light passing through the louver body 7, such a problem wherein the light penetrates the marked layer 12 and disperses excessively and is reflected on a windshield of a car, is reduced.

The non-diffusion paint layer 13 makes an illuminating light to penetrate in a non-dispersion state when the illumination is not on such as during the daytime, the indication marked on the marked layer 12 is shown clearly by incident light from outside being reflected on the non-diffusion paint layer 13 after passing through the paint eliminating portion of the marked layer 12.

Generally, miniaturization is required for the operating knob of a switch. Especially, in the field of electric equipment for a car, miniaturization in both the dimension and weight of the car itself are required.

In the illuminating knob, the accommodating concave 4 should be formed on the bottom portion 2 where the louver body 7 is mounted to fit as in the above mentioned prior art. An area required for a mounting portion becomes necessarily larger. If the mounting portion is made small as it is, an indication pattern of the indication portion by the penetrating light is made small in proportion to the mounting portion. Thus, it is hard to see the pattern. Therefore, miniaturization of the base 1 has certain limits.

Further, in the mounting of the louver body 7, if the surface of the louver body becomes uneven with a circumferential surface of the mounting concave 4 of the bottom portion 2, the unevenness is apt to spoil an appearance and a touch feeling. Where dust is collected in the slit 9 formed on the circumference of the louver body 7, the appearance is also damaged.

SUMMARY OF THE INVENTION

In order to resolve the above problems, an illuminating knob for a switch, which is substantially shaped in a bottomed cylinder to turn the switch on or off, to indicate an indicating pattern formed on the bottom portion with the light penetrating from a light source provided inside of the knob, according to the present invention includes a base made of a transparent material as a main body of the knob, and a topcoat applied on the main body which penetrates no light.

A pattern eliminating portion is provided in a shape according to an indicating pattern on the topcoat layer on the bottom portion and the light is penetrated through the pattern eliminating portion.

According to the aforementioned, it is also possible that the bottom of the base is formed in a shape having a curved surface. A louver for preventing a diffusion of light is provided inside the base of the bottom portion. Further, an undercoat made of non-diffusion paint may be applied on the base under the topcoat.

In a process for manufacturing the illustrating knob for the switch in one aspect of the present invention, a base as a main body is formed of a transparent material, an undercoat made of a non-diffusion paint is applied on the base, a non-penetration topcoat is applied on the undercoat, and the pattern eliminating portion according to the indicating pattern is formed on a part of the topcoat layer on the bottom portion by a laser etching or an exfoliation method.

The feature of the present invention is that the main body of the illuminating knob is formed as the transparent base in the shape of a bottomed cylinder, the topcoat layer is formed on the surface hereof, and then the indication pattern for the indication by the penetrating light is formed as a result of eliminating partially the topcoat on the bottom portion.

Because it is unnecessary to form a special installing portion for fitting the louver body on the bottom of the illuminating knob, it is possible to make the illuminating knob in a small size keeping the indication pattern in a predetermined size compared with the knob. In addition, the number of parts is reduced and the production of the knob is easily accomplished.

Moreover, since an inside eliminating portion is formed on the topcoat, little unevenness and almost a flat surface is attained, the appearance and the touch feeling are improved and dust hardly sticks thereon.

If the undercoat, made of the non-diffusion paint, is formed, the number of parts can be further reduced because it is unnecessary to use the plate formed with non-diffusion paint layer thereon.

Further, since the topcoat is formed by applying the material and the inside eliminating portion is formed on a part of the bottom portion of the base, even if the base bottom is formed in the shape of a curved surface, the indication pattern is easily formed.

Furthermore, if the louver is installed inside of the bottom portion 53, since dispersion of the penetrating light can be lessened, little windshield reflection is obtained even when the knob is used with electric equipment for a vehicle.

Further, in the process for manufacturing the illuminating knob of the present invention, because the topcoat is formed by applying the material and the inside eliminating portion is formed on the part of the topcoat formed on the bottom portion by laser etching or an exfoliation method, even if the bottom portion of the knob is narrow and has a complex three dimensional curved surface, the indication pattern is formed easily by machining.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
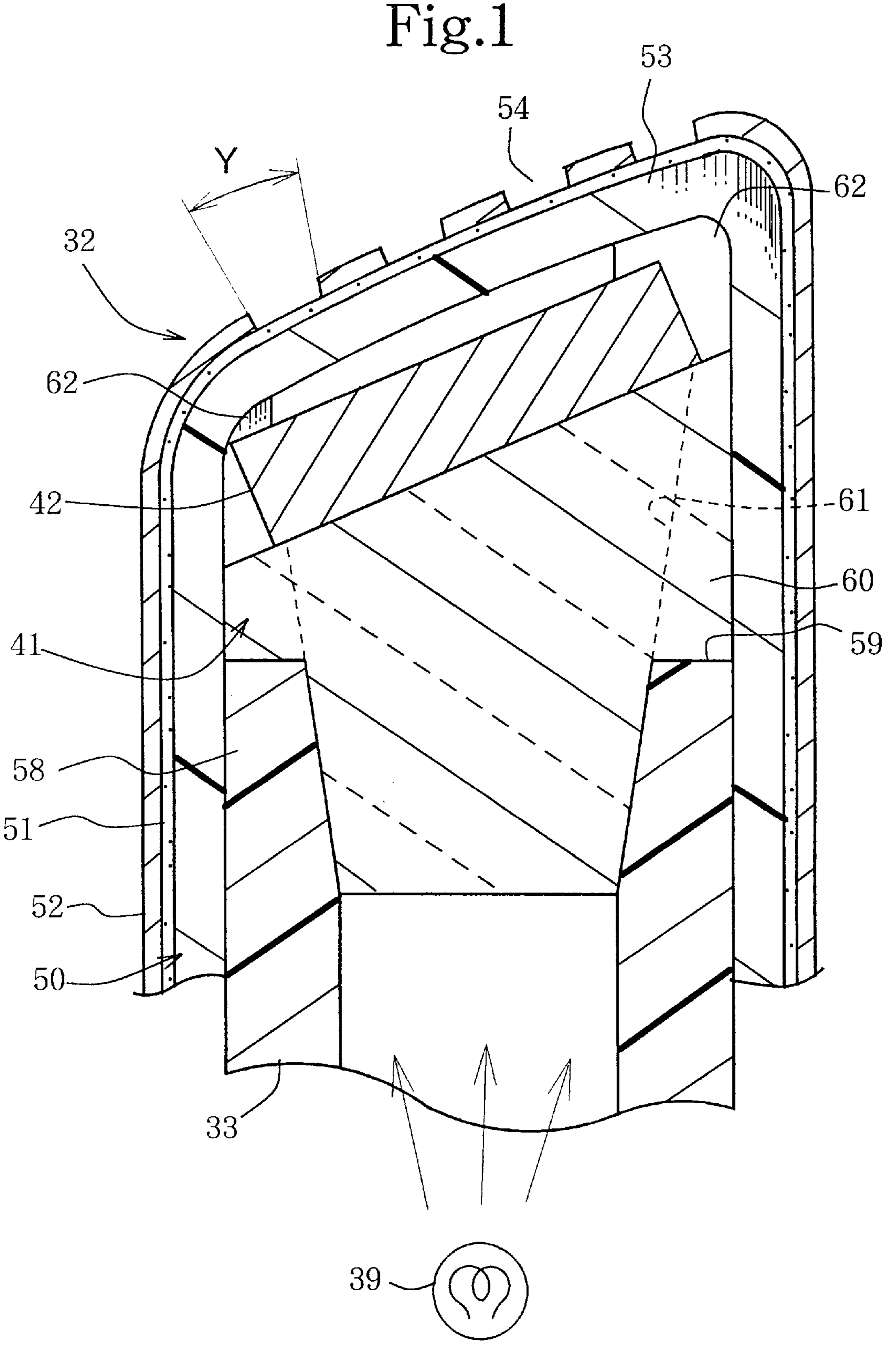
FIG. 1 is an enlarged sectional view showing an illuminating knob portion of the present invention.

One embodiment constructed for an illuminating knob arranged for a switch for electric equipment for a vehicle will be described with reference to the accompanying drawings. As shown in FIGS. 1–6, the switch is provided with a switch case 30 and the knob 32 projects from a front portion 31 of the switch knob.

The knob 32 is placed in a top end of a holder 33 installed in a switch case 30 and another end of the holder 33 engages with an end of an actuator rod 35 with a claw member 34.

The actuator rod 35 moves upwardly and downwardly so as to operate a micro-switch 36 and a return spring 37 is disposed between the holder 33 and the micro-switch 36.

Figure 4:
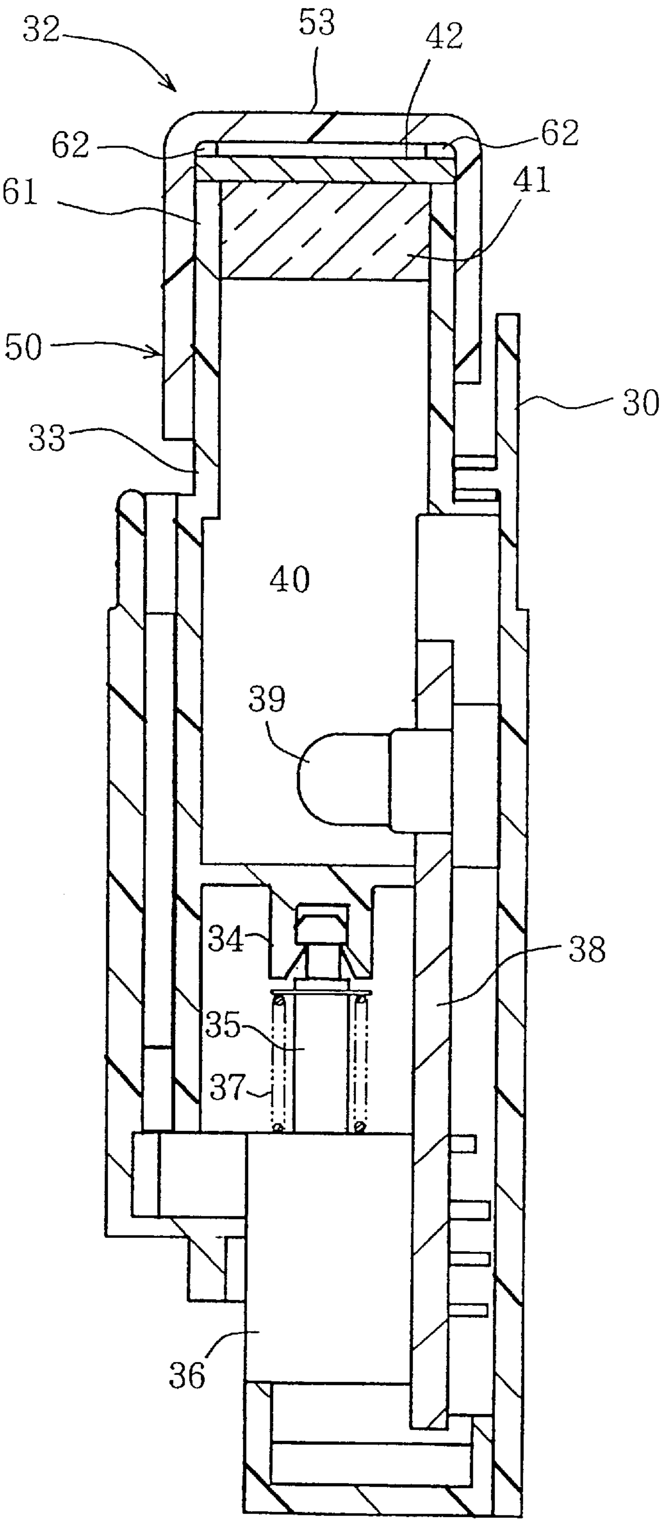
FIG. 4 is a sectional view taking along line 4—4 of FIG. 3.

As is apparent from FIG. 4, the micro-switch 36 is mounted on one end of a circuit board 38 and a bulb 39 projects into a space 40 in the holder 33 on another end of the circuit board 38.

A light guide member 41 is fitted on one end of the holder 33 mounted with the knob 32 thereon, and a louver member 42 is situated between the light guide member 41 and the knob 32.

The micro-switch 36 is wired to an electric supply connector 43. (see FIG. 3) By depressing the knob 32, the micro-switch is turned on or off alternately every time when the actuator rod is pushed down with the holder 33.

Figure 5:
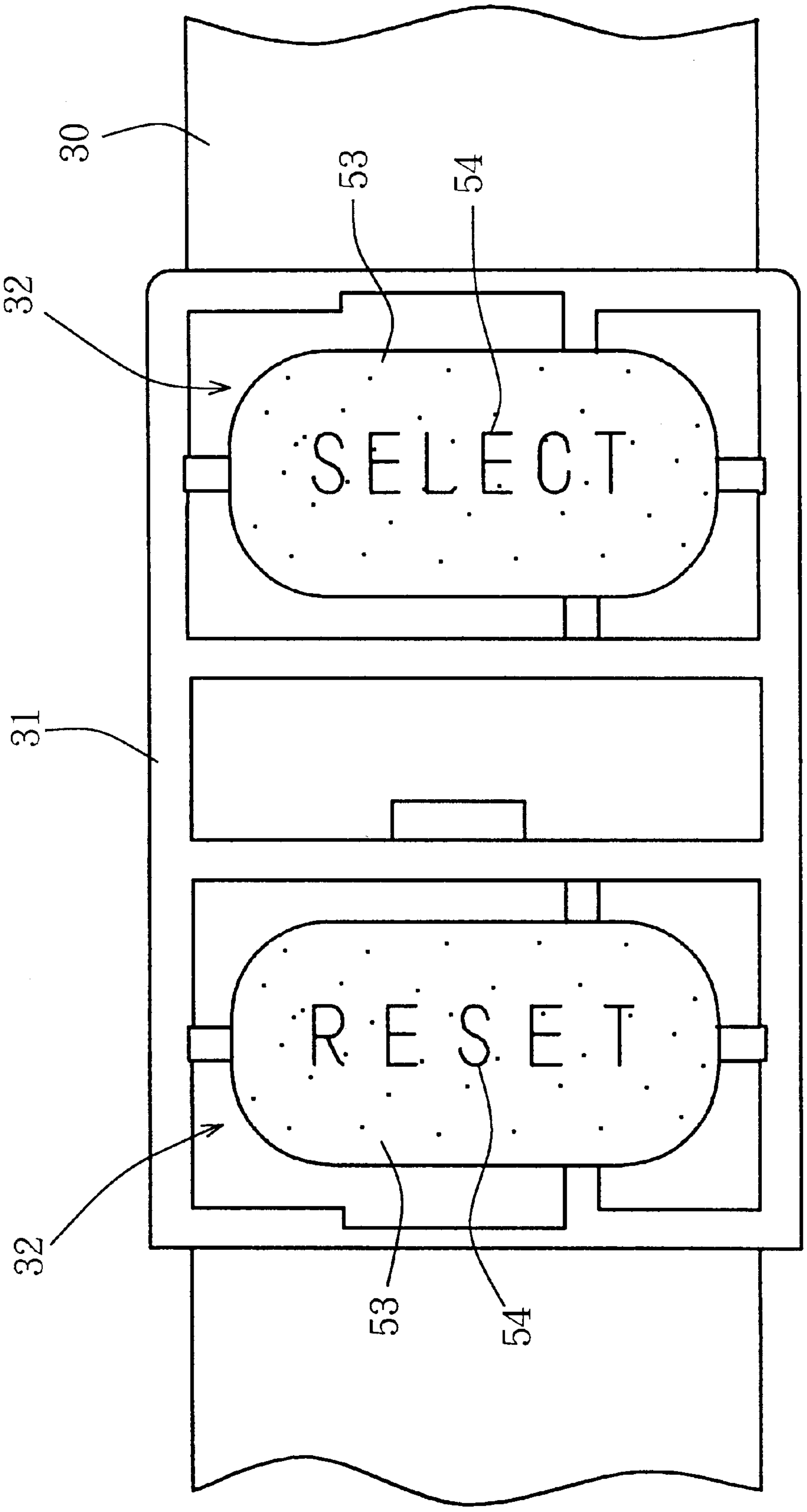
FIG. 5 is a view from the direction of arrow X of FIG. 3.

The bulb 39 is turned on or off through the circuit board 38 by the switching of a not shown lighting switch. When it is turned on, the light from the bulb 39 passes through the light guide member 41 and the louver body 42. As shown in FIG. 5, a predetermined pattern is indicated by the light penetrating from a marked portion of the knob 32 to be mentioned hereinafter.

Figure 3:
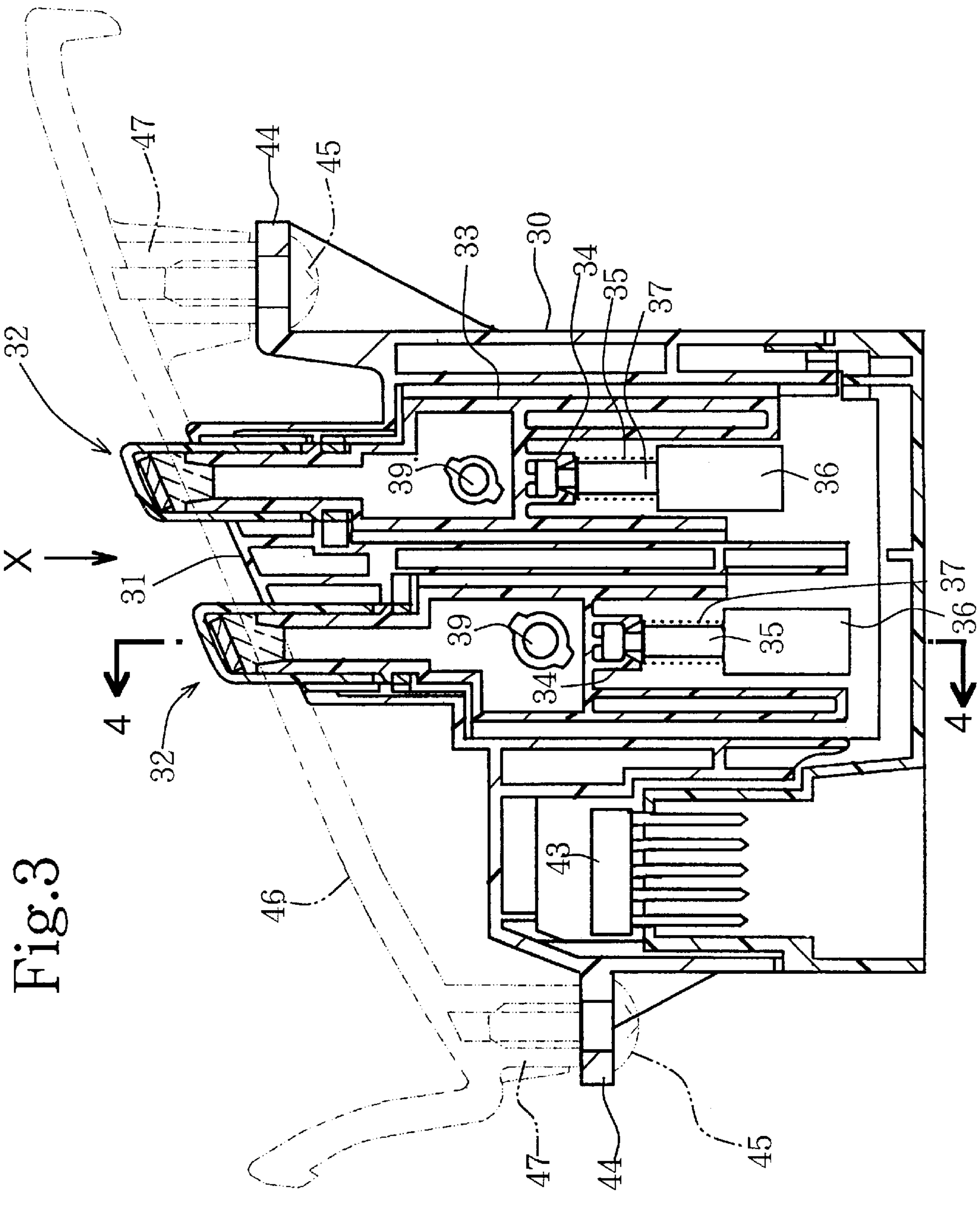
FIG. 3 is an entire sectional view showing a switch using the illuminating knob.

FIG. 3 illustrates a mounting portion 44 mounted to bosses 47 of a car side member 46 with screws 45.

FIG. 1 is an enlarged view showing the vicinity of the knob 32. The knob 32 consists of a base 50 as the main body, an undercoat layer 51 and a topcoat layer 52 formed on a surface of the base.

The base 50 is substantially shaped as a bottomed cylinder and made of a highly transparent resin such as a polycarbonate or an acryl. The bottom portion 53 is made in a shape having a three dimensionally curved surface, and a marked portion 54, formed as an inside eliminating portion formed by eliminating partially the topcoat layer, is formed on a surface of the bottom portion.

An undercoat layer 51 is formed by applying non-diffusion paint on the bottom portion. The non-diffusion paint used here is a well known paint which has a property which allows the light to penetrate so as not to be dispersed by mixing with minute aluminum particle and the like.

The topcoat layer 52 is made of a non-penetration paint such as black or another color which is formed on all the surfaces of the undercoat layer 51 except the marked portion 54.

The marked portion 54 is formed on an inside eliminating portion by eliminating the paint of the topcoat layer 52 on the bottom portion 53 to form a necessary indicating pattern such as a letter and a design. The shape of the inside eliminating portion forms a predetermined indicating pattern shown in FIG. 5.

Figure 2:
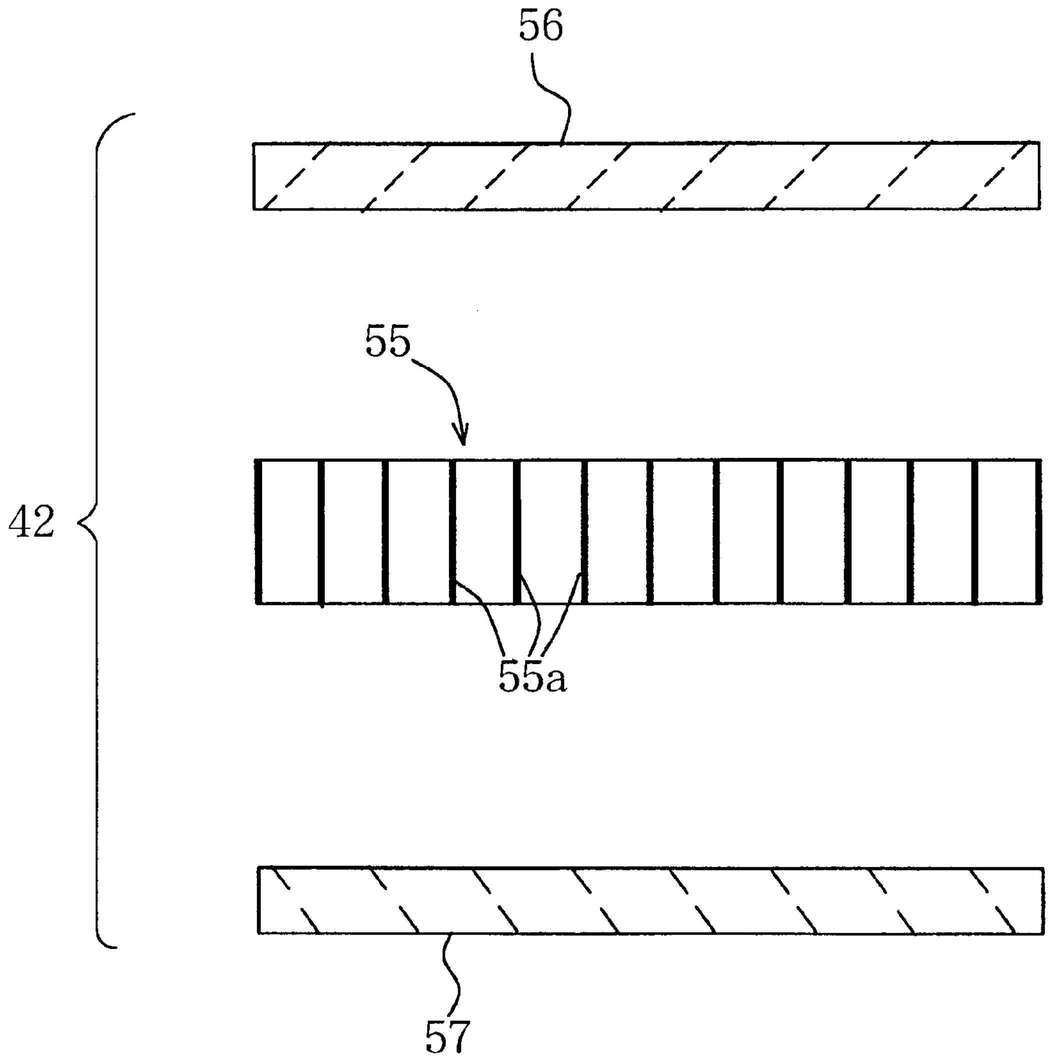
FIG. 2 is an enlarged sectional view showing a louver body thereof.

FIG. 2 is an enlarged sectional view showing the louver member 42, which is constructed from superposing transparent plates 56 and 57 made of transparent resin such as polycarbonate and the like on both surfaces of the louver 55 made of non-penetration black rubber.

The louver 55 is a well known one which includes a plurality of partitions 55*a* extending in parallel and spaced a distance apart to allow the light penetrate between the partitions. The light passes only in the direction of the passage as to not disperse the light by opening both end of the passage.

Again, as is apparent from FIG. 1, the knob 32 is fitted on a periphery of a neck portion 58 of the holder 33. A narrow groove 59 is formed at an end of the neck portion 58 to a longitudinal direction and the light guide 41 is supported on the holder 33 by fitting a side convex portion 60 integrated on the side of the light guide 41 in the narrow groove 59.

A prolonged end portion 61, which is a point portion of the neck portion 58 except the narrow groove 59, extends to an upper point of the light guide 41. The louver body 42 is held between the prolonged end 61 and a rib 62 which is integrated in an inside of the bottom portion 53.

Figure 6A:
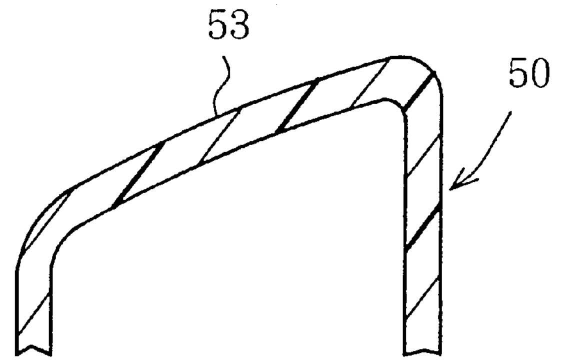
FIGS. 6(A), 6(B), 6(C) and 6(D) are views showing a manufacturing process of the illuminating knob.

FIGS. 6(A) to 6(D) are views showing a manufacturing process of the knob 32. At first, the base 50 is molded with transparent resin as shown in FIG. 6(A).

Figure 6B:
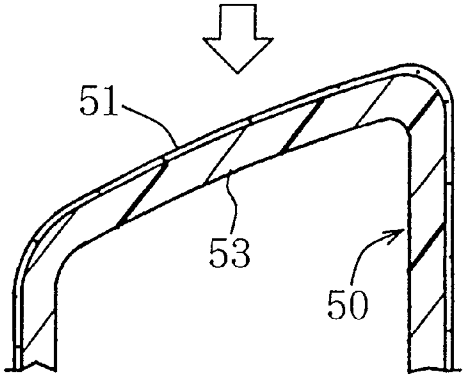
Figure 6C:
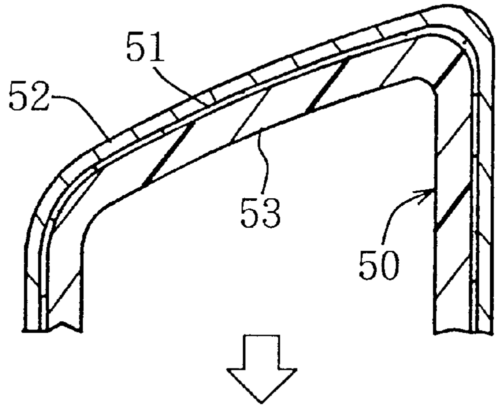
Figure 6D:
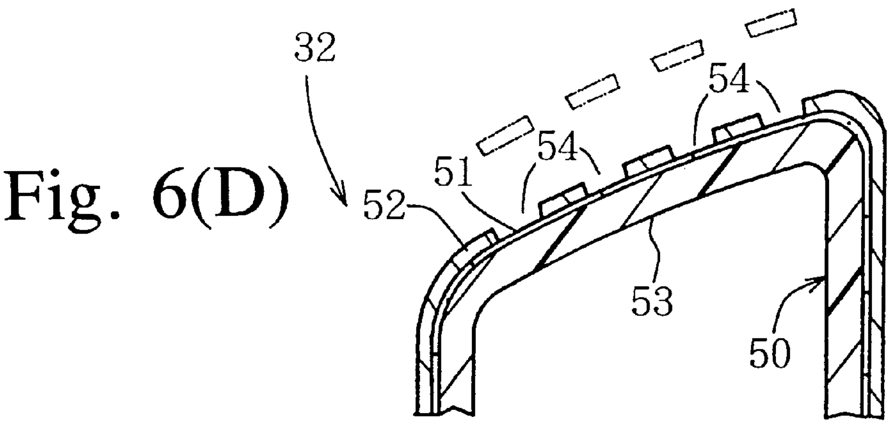
Figure 7:
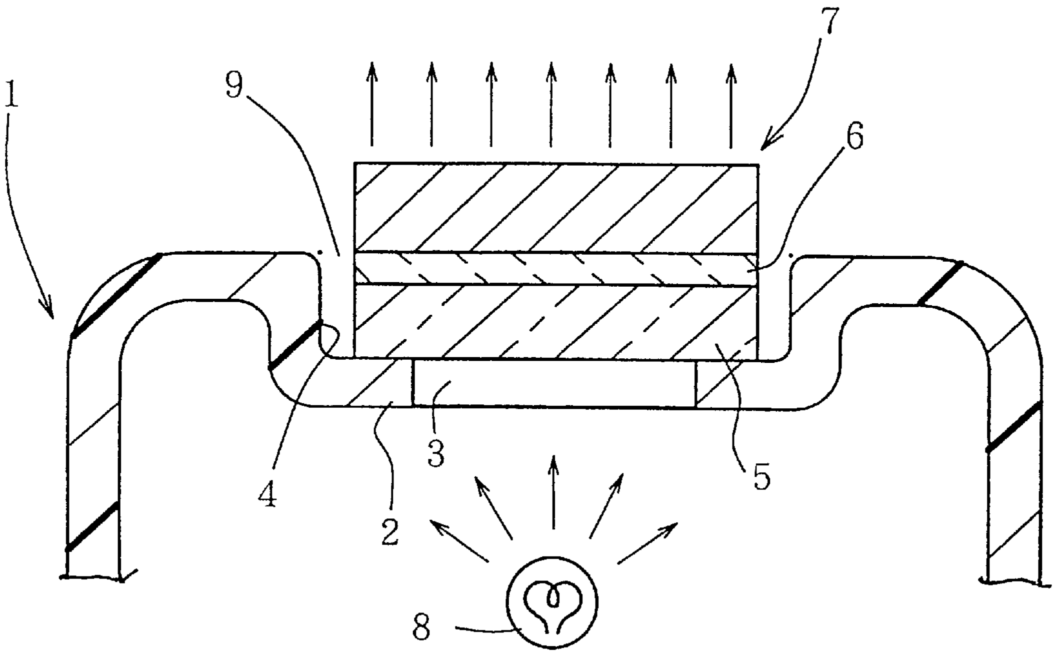
Fig.7 PRIOR ART
FIG. 7 is a schematically explanatory sectional view of an example of the illuminating knob of the prior art.
Figure 8:
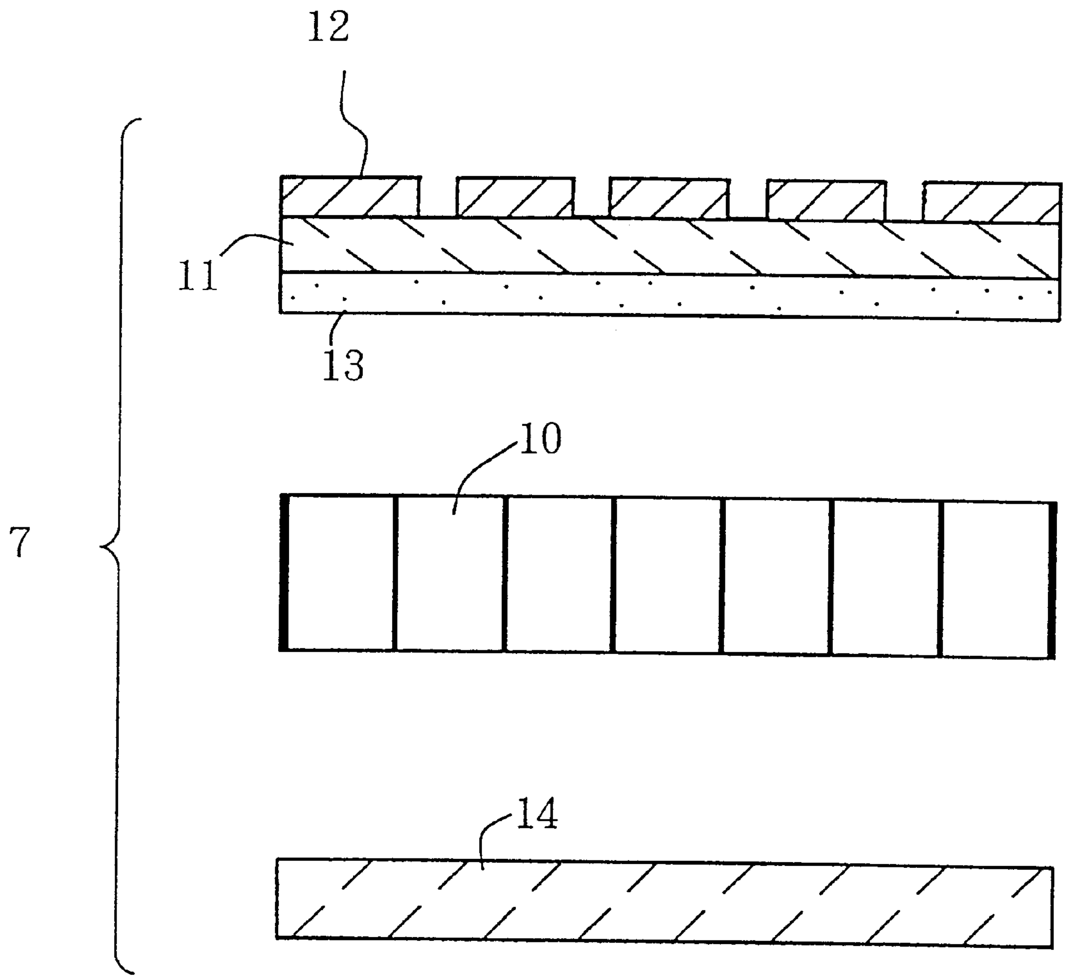
Fig.8 PRIOR ART
FIG. 8 is an exploded view of the louver body in the example of FIG. 7.

Next, the undercoat layer 51 is applied on the whole periphery of the base 50 as shown in FIG. 6(B) and further, the topcoat layer 52 is applied on the whole surface thereof as shown in FIG. 6(C). Next, as shown in FIG. 6(D), the marked portion 54 is formed in a shape of the pattern inside the eliminating portion by partially eliminating the topcoat layer 52 on the bottom portion 53 with a laser etching.

The laser etching is a well known technique to eliminate partially a paint surface and the like by a laser beam. But an exfoliation method can be used instead of the laser etching, in which a predetermined pattern is torn off from the painted surface by using an adhesive agent and the like.

In this case, if in advance a material such as an exfoliation agent, available to be torn off easily, is applied on a position corresponding to an exfoliating portion of the undercoat layer 51, it is difficult for the topcoat layer 52 to stick on this portion. It is possible to tear off the exfoliating portion easily with an exfoliating tape applied with the adhesive agent and to form a precise marked portion 54 in a comparatively narrow portion.

Next, an operation in an embodiment of the present invention will be explained. As shown in FIG. 1, the light from the bulb 39 passes through the light guide member 41, brightening the whole portion owing to diffusion of the light, and reaches to the bottom portion 53 as limited to the diffusion by the louver member 42 to indicate the marked portion 54 via the penetrating light. A region shown by an arrow Y in FIG. 1 is a dispersion region of the penetrating light and the region is adjusted not to permit a windshield reflection.

At this time, the undercoat layer 51 is helpful to restrain the dispersion of the light passing through the louver member 42. Besides, when the bulb 39 is switched off during the daytime or in a bright place, since an incident ray from the outside of the marked portion 54 is reflected on the undercoat layer 51 as a result of an inside of the knob being darkened and indicates the marked portion 54, it is helpful also to see clearly the marked portion 54.

Moreover, since the marked portion 54 is formed by eliminating partially the topcoat layer 52, it is possible to make an area of the bottom portion very small compared to the area of the prior art. Miniaturizing of the knob 32 can be achieved by keeping a dimension of the marked portion 54 the same as the marked portion of the prior art.

Besides, since the marked portion 54 is indented only to a depth equivalent to a film thickness of the comparatively thin topcoat layer 52 as some ten microns at most, it can be almost the same height as a surface of a circumferential bottom portion 53. As a result of that, the appearance and the feeling is improved and the neighboring portions of the marked portion are difficult to cover with dust.

Further, since the marked portion 54 is obtained from two layers of the undercoat layer 51 and the topcoat layer 52 applied doubly on the base 50 and then is machined by the laser etching or other process, the bottom portion is formed easily even if it has a curved surface, and the degree of freedom in the design of the marked portion 54 becomes larger.

The laser etching is especially favorable since it can process easily a fine machining on such a narrow three dimensional curved surface.

Moreover, as any process formerly needed to make a marked printed plate is unnecessary, manufacturing of the knob is easily achieved and the number of parts can be reduced.

Further, since the louver body 42 comprises only the louver and the transparent plates 56 and 57, it can be composed in simple construction as compared with the former one.

The present invention herein shown and described is not limited to the above-mentioned embodiment and various modifications can be made. For example, instead of the forming of the marked pattern 54 by machining such as laser etching or others, the topcoat layer 52 can be formed by a mask painting or a direct inside elimination painting in which the marked portion 54 is removed inside thereof.

Further, the undercoat layer 51 is omitted, instead of which, it is possible that the non-diffusion paint is applied on the transparent plate 56 of the louver 42 or another transparent plate applied in advance with the non-diffusion paint is overlaid on the louver body 42.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. In an illuminating knob for a switch, which is substantially in the shape of a cylinder having a hollow interior and a closed end, for turning said switch on or off, and for indicating a pattern formed on a portion thereof by light penetrating from a light source provided inside of said knob, comprising:

a main body of said knob made of a transparent material;

an undercoat made of non-diffusion paint applied on said main body; and a topcoat layer applied on said main body over said undercoat to prevent penetration of light;

wherein a pattern is provided on said topcoat layer on said main body and the light penetrates through said pattern.

2. The illuminating knob for a switch in accordance with claim 1, wherein said main body is formed in a shape having a curved surface.

3. The illuminating knob for a switch in accordance with claim 1, wherein a louver for preventing diffusion of light is provide inside said main body.

4. A process for manufacturing an illuminating knob for a switch, which is substantially in the shape of a cylinder having a hollow interior and a closed end, for turning said switch on or off, and for indicating a pattern formed on a portion thereof by light penetrating from a light source provided inside of said knob, wherein said process comprises the steps of:

forming a main body of said knob of a transparent material;

applying an undercoat made of non-diffusion paint on said main body;

applying a non-penetration topcoat on said undercoat; and forming a pattern on a part of said topcoat layer by a laser etching or an exfoliation method.

5. The process for manufacturing an illuminating knob according to claim 4, and further including the step of positioning a louver member inside said main body for transmitting light therethrough.

6. An illuminating knob for a switch comprising:

a cylinder having a hollow interior and a closed end for turning said switch on or off;

a light source provided inside of said cylinder for illuminating a display on said cylinder by light penetrating therethrough;

said cylinder made of a transparent material and forming a main body of said knob;

an undercoat made of non-diffusion paint applied on said main body; and a topcoat applied on said main body over said undercoat to prevent penetration of light;

wherein said display is a pattern which is provided on said topcoat layer and said light penetrates through said pattern.

7. The illuminating knob for a switch in accordance with claim 6, wherein a bottom portion of said main body is a curved surface.

8. The illuminating knob for a switch in accordance with claim 6, wherein a louver for preventing a diffusion of light is provided inside said main body.

9. An illuminating knob for a switch comprising:

a hollow member having an interior portion, a closed end and an open end, said opened end being mounted for reciprocation for actuating said switch, said hollow member being constructed of a transparent material;

a light source being disposed to illuminate the interior portion of said hollow member;

an undercoat made of non-diffusion paint applied on said closed end;

a topcoat layer applied on said closed end of said hollow member over said undercoat to prevent penetration of light;

a portion of said topcoat being removed in correspondence with a predetermined pattern for permitting light to penetrate therethrough for illuminating said pattern on said hollow member.

10. The illuminating knob for a switch in accordance with claim 9, wherein said closed end is a curved surface.

11. The illuminating knob for a switch in accordance with claim 9, wherein a louver for preventing a diffusion of light is provided inside said hollow member.

* * * * *